United States Patent
Aichi (10) Patent No.: US 7,346,188 B2
(45) Date of Patent: Mar. 18, 2008

(54) MOTION DETECTION METHOD AND DEVICE, PROGRAM AND VEHICLE SURVEILLANCE SYSTEM

(75) Inventor: Isao Aichi, Toyota (JP)

(73) Assignee: DENSO CORPORATION, Kariya (JP)

( * ) Notice: Subject to any disclaimer, the term of this patent is extended or adjusted under 35 U.S.C. 154(b) by 436 days.

(21) Appl. No.: 11/159,250

(22) Filed: Jun. 23, 2005

(65) Prior Publication Data

US 2006/0039584 A1    Feb. 23, 2006

(30) Foreign Application Priority Data

Aug. 23, 2004  (JP) .............................. 2004-242385

(51) Int. Cl.
G06K 9/00  (2006.01)
(52) U.S. Cl. ...................................... 382/103; 382/154
(58) Field of Classification Search ................ 382/103, 382/154
See application file for complete search history.

(56) References Cited

U.S. PATENT DOCUMENTS

| | | | | |
|---|---|---|---|---|
| 4,020,281 A | * | 4/1977 | Davis, Jr. ................. | 178/18.09 |
| 4,490,851 A | * | 12/1984 | Gerhart et al. .............. | 382/103 |
| 5,276,513 A | | 1/1994 | van der Wal et al. | |
| 7,082,210 B2 | * | 7/2006 | Sugimoto et al. ........... | 382/103 |
| 2002/0154791 A1 | * | 10/2002 | Onuma et al. .............. | 382/103 |
| 2003/0031345 A1 | * | 2/2003 | Farmer ....................... | 382/103 |
| 2003/0099400 A1 | * | 5/2003 | Ishikawa .................... | 382/190 |
| 2004/0032971 A1 | * | 2/2004 | Nagaoka et al. ............ | 382/103 |

FOREIGN PATENT DOCUMENTS

JP     B2-6-14698     2/1994
JP     A-2003-99782   4/2003

* cited by examiner

Primary Examiner—Brian Werner
Assistant Examiner—Hadi Akhavannik
(74) Attorney, Agent, or Firm—Posz Law Group, PLC

(57) ABSTRACT

Based on an input image from an imaging device and a preset background image, a digitized image is generated for each frame. The digitized images are compared. Then, an increased region, a decreased region, and an overlap region, which are adjacent to each other, are extracted as a single integrated region. Region parameters, which are a region area, a sum of X-coordinates and a sum of Y-coordinates, are obtained for each of the extracted integrated region, the increased region and the decreased region. Based on the region parameters, a motion of the object displayed on the integrated region is obtained for each of the integrated regions.

9 Claims, 6 Drawing Sheets

MOVING TO LEFT

FIG. 7B

MOVING TO RIGHT

FIG. 7C

APPROACHING

FIG. 7D

LEAVING

MOTION DETECTION METHOD AND DEVICE, PROGRAM AND VEHICLE SURVEILLANCE SYSTEM

CROSS REFERENCE TO RELATED APPLICATION

This application is based on and incorporates herein by reference Japanese Patent Application No. 2004-242385 filed on Aug. 23, 2004.

FIELD OF THE INVENTION

The present invention relates to a motion detection method and a device for detecting a motion of an object displayed on an image. The present invention also relates to a vehicle surveillance system using the motion detection method and the device.

BACKGROUND OF THE INVENTION

For detecting a motion of an object displayed on an image, the image is horizontally and vertically divided into a plurality of image blocks so as to calculate a motion vector for each of the image blocks. The motion vector indicates a direction, in which each of the image blocks moves.

Specifically, a correlation operation such as pattern matching is performed between an image block obtained by clipping an image at a certain time (a target block) and an image block obtained by clipping an image at different time (a comparative block). The same process is repeated while vertically and horizontally moving the position of the comparative block by one pixel within a search range that is set with respect to the position corresponding to the target block as the center. A comparative block having the largest correlation value of all the obtained correlation values is specified as a destination block or a source block.

In this method, assuming that the number of target blocks obtained by clipping the image is M, the number of pixels in each of the target blocks is L×L, and a range set by adding N pixels around the target blocks is a search range, $L^2 \times M \times (2N+1)^2$ correlation operations are required. Therefore, an enormous amount of operations is needed.

For example, assuming that an image contains 640×480 pixels, a target block contains 16×16 pixels, and a search range is ±32 pixels, L=16, M=1200 and N=32 are obtained. Accordingly, the amount of correlation operations is about 1.3 G (giga) times for one frame.

In order to reduce the amount of correlation operations, pixels are thinned out to generate a plurality of images with different resolutions. First, a search is made with the image having the lowest resolution. By using the result of the search, the search is repeatedly made with the images having higher resolutions (for example, U.S. Pat. No. 5,276,513 (JP 6-60187 A) and JP 2003-99782 A). However, this method basically uses pattern matching, there arises a problem that the reduction of a large amount of operations cannot be expected even if a hierarchical method is used. Moreover, if the search range is expanded, the amount of operations exponential-functionally increases. Therefore, the search range is limited by operating capacity. As a result, an object with great movement, that is, a fast-moving object cannot be detected.

On the other hand, a method of detecting the amount of movement and a moving direction of an object displayed on a differential image (subtraction image) without using pattern matching is also known. In this method, a background differential image corresponding to a differential image between a pre-prepared background image and an input image is obtained for each frame of the input image. The background differential images are compared between frames so as to extract a region with a difference (a differential region). The amount of movement and a moving direction of a center of gravity of the extracted differential region are obtained (for example, JP 6-14698 B2). In this method, however, a single area center is obtained from the entire image. Therefore, if there are a plurality of objects to be detected, a motion for each of the objects to be detected cannot be detected.

The center of gravity of the differential region is specifically calculated in the following manner. A distribution of the number of pixels contained in the differential region is obtained for an X-coordinate axis and a Y-coordinate axis of two-dimensional coordinates indicative of the position of a pixel. From the distribution, the X-coordinate and the Y-coordinate halving a total number of pixels contained in the differential region, that is, the center of the area of the differential region, are obtained as the center of gravity of the differential region.

SUMMARY OF THE INVENTION

The present invention has an object to provide a motion detection method and a device allowing the reduction of the amount of operations and the detection of an individual motion even if a plurality of objects to be detected are present, and a vehicle surveillance system using the same.

According to the present invention, a background differential image corresponding to a differential image between an input image sequentially input for each frame and a preset background image is first digitized (binarized) to generate a digitized image (binary image) composed of a target region different from the background image and a background region with no difference from the background image for each frame.

Then, the digitized images are compared between frames to extract an overlap region remaining as the target image, an increased region changed from the background region to the target region, and a decreased region changed from the target region to the background region.

Furthermore, region parameters are obtained for each of an integrated region, the increased region, and the decreased region, the integrated region being obtained by integrating the overlap region, and the increased region and the decreased region adjacent to the overlap region. Here, the region parameters are composed of the number of pixels contained in the region, the sum of X-coordinates obtained by adding X-coordinate values in two-dimensional coordinates indicating the position of a pixel for all the pixels contained in the region, the sum of Y-coordinates obtained by adding Y-coordinate values for all the pixels contained in the region.

Then, a motion of a moving object displayed on the integrated region is detected for each of the integrated regions based on the region parameters.

Specifically, as shown in FIGS. 7A to 7D, a moving direction or the amount of movement of the moving object displayed on the integrated region can be obtained from the position or the size (the area) of the increased region and the decreased region in the integrated region.

More specifically, the sum of X-coordinates of a certain region is divided (segmented) by the number of pixels contained in the region to obtain an X-coordinate of a center of gravity of the region. Similarly, the sum of Y-coordinates of the certain region is divided by the number of pixels contained in the region to obtain a Y-coordinate of the center of gravity of the region. A region obtained by subtracting the increased region from the integrated region corresponds to a target region before movement, whereas a region obtained by subtracting the decreased region from the integrated region corresponds to a target region after movement.

The position of the center of gravity of the moving object before movement (a target region of the previous frame) displayed on the integrated region and the position of the center of gravity of the moving object after movement (a target region of the current frame) can be obtained based on the region parameters of the integrated region, the increased region, and the decreased region. From a change of the position of the center of gravity, a motion (the amount of movement or a moving direction) of the moving object can be detected.

As described above, a motion of the moving object displayed on the integrated region is detected for each of the integrated regions. Therefore, even if the input image contains a plurality of objects to be detected, a motion of each of the objects to be detected can be individually detected. Moreover, since the integrated region, the increased region and the decreased region can be detected without pattern matching, the amount of operations for motion detection can be remarkably reduced.

Specifically, in the present invention, only a differential operation for generating a digitized image (a background differential image) and a comparison operation of the digitized images for region extraction are required to be performed at the extraction of the integrated region, the increased region, and the decreased region. Therefore, for example, assuming that the input image contains 640×480 pixels, the amount of operations is about 0.6 M times (=640×480×2) for each frame, which is about 1/2000 of that of the above conventional device (about 1.3 G times for each frame).

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
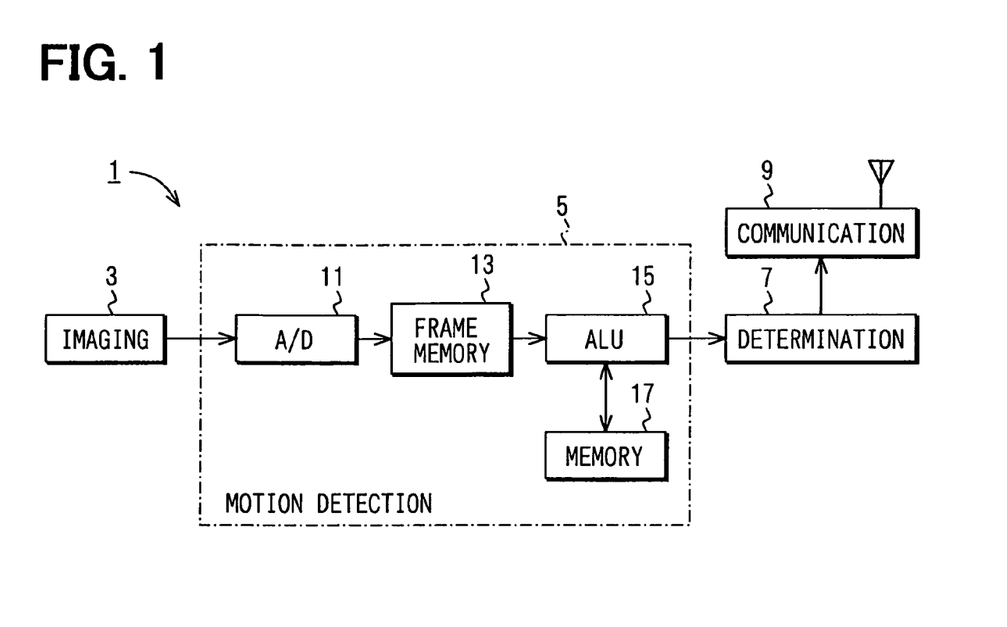
FIG. 1 is a block diagram showing a vehicle surveillance system according to an embodiment of the present invention.

As shown in FIG. 1, a vehicle surveillance system 1 includes an imaging device 3, a motion detection device 5, a determination device 7 and a communication device 9. The imaging device 3 may be a fisheye camera. The motion detection device 5 is for detecting a motion of a moving object based on an image signal supplied from the imaging device 3. The determination device 7 is for determining the presence of an intruder or a suspicious individual based on the result of detection in the motion detection device 5. The communication device 9 is for transmitting the result of determination in the determination device 7 to a preset destination to be informed.

Figure 2A:
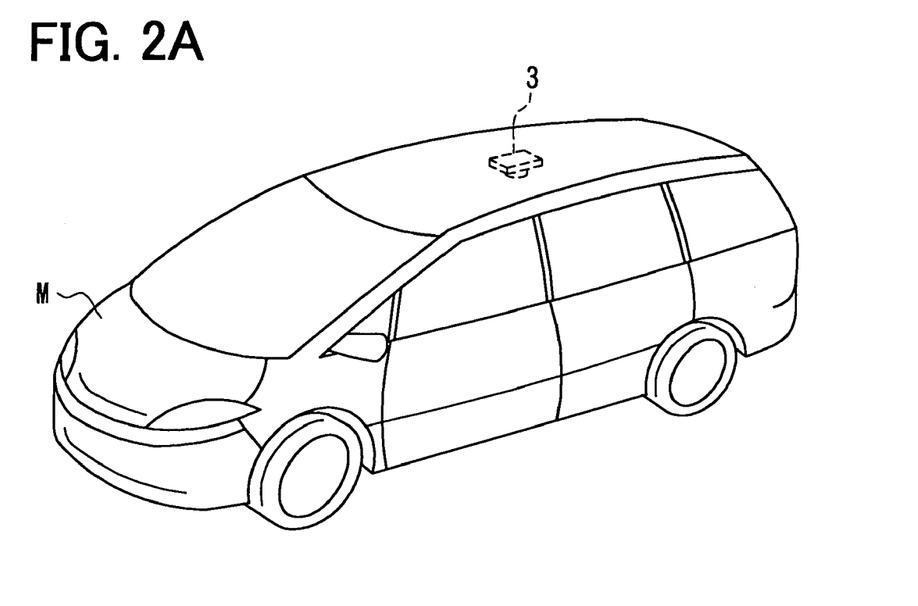
FIGS. 2A and 2B are schematic views showing an arrangement of an imaging device and an image captured by the imaging device, respectively.
Figure 2B:
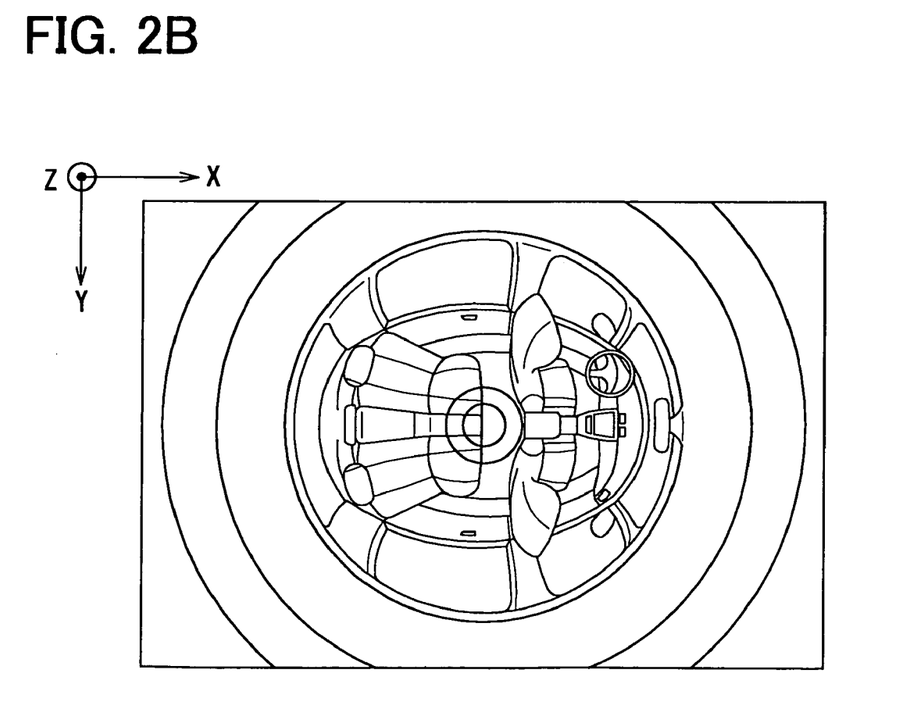

The imaging device 3 is provided in the middle of an interior top roof of a vehicle as shown in FIG. 2A. As shown in FIG. 2B, the imaging device 3 is set so as to obtain images of the vehicle interior and around the vehicle through a window by the single imaging device 3. In the captured image, a vehicle length direction is referred to as an X-axis direction, a vehicle width direction is referred to as a Y-axis direction, and a perpendicular direction to both the X-axis and Y-axis directions is referred to as a Z-axis direction.

The motion detection device 5 includes an A/D converter 11, a frame memory 13, an ALU (arithmetic and logic unit) 15 comprising a microcomputer and a memory unit 17. The A/D converter 11 digitally converts an analog image signal from the imaging device 3. The frame memory 13 stores an output from the A/D converter 11 for each frame (one screen). The ALU 15 performs a motion detecting process for detecting a motion of an imaged moving object based on the contents stored in the frame memory 13 and the like. The memory unit 17 stores a program of the motion detecting process performed by the ALU 15, a background image used in the motion detecting process and various images generated in the course of execution of the process.

The background image stored in the memory unit 17 is an image taken with the absence of a moving object in an imaging range. An image captured by the imaging device 3 at the shipment of the vehicle may be fixedly used or an image captured by the imaging device 3 at preset time point each time a vehicle door is locked may be used.

The motion detecting process performed by the ALU 15 is shown in FIGS. 3 to 6. This process is repeated for each certain time that is set to be longer than the time required by the imaging device 3 for taking an image.

Figure 3:
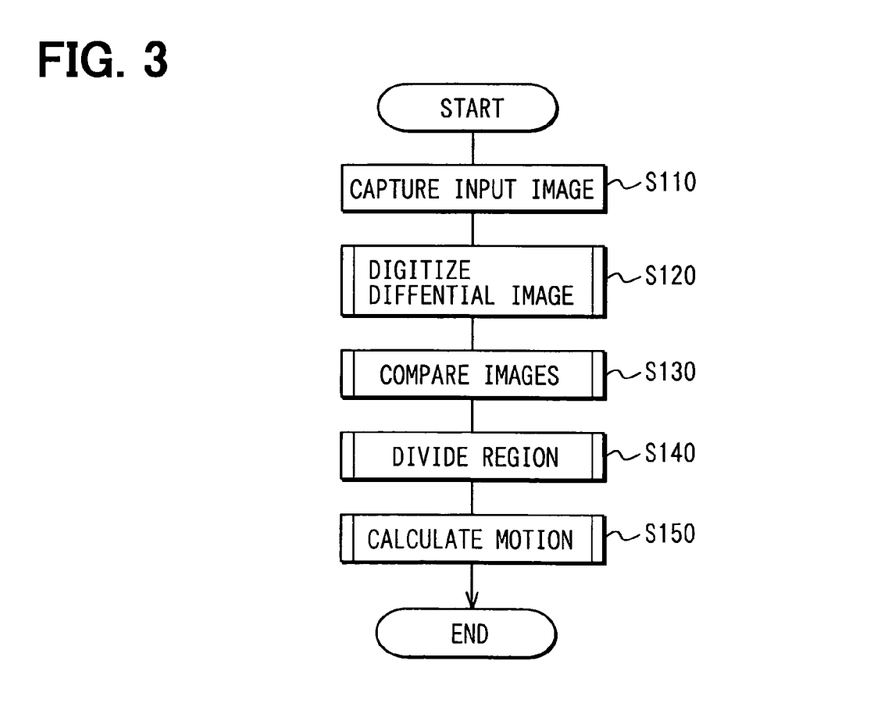
FIG. 3 is a flowchart showing a motion detecting process executed in the embodiment.

When the process is started, image data for one frame (input image) is first captured into the frame memory 13 from the imaging device 3 (S110). Then, a background difference digitizing process is performed (S120) in such a manner that a background differential image corresponding to a differential image between the input image captured into the frame memory 13 and the background image stored in the memory unit 17 is digitized to generate a digitized image. It is assumed that the input image contains m pixels in the X-axis direction (e.g., m=640) and n pixels in the Y-axis direction (e.g., n=480).

Figure 4:
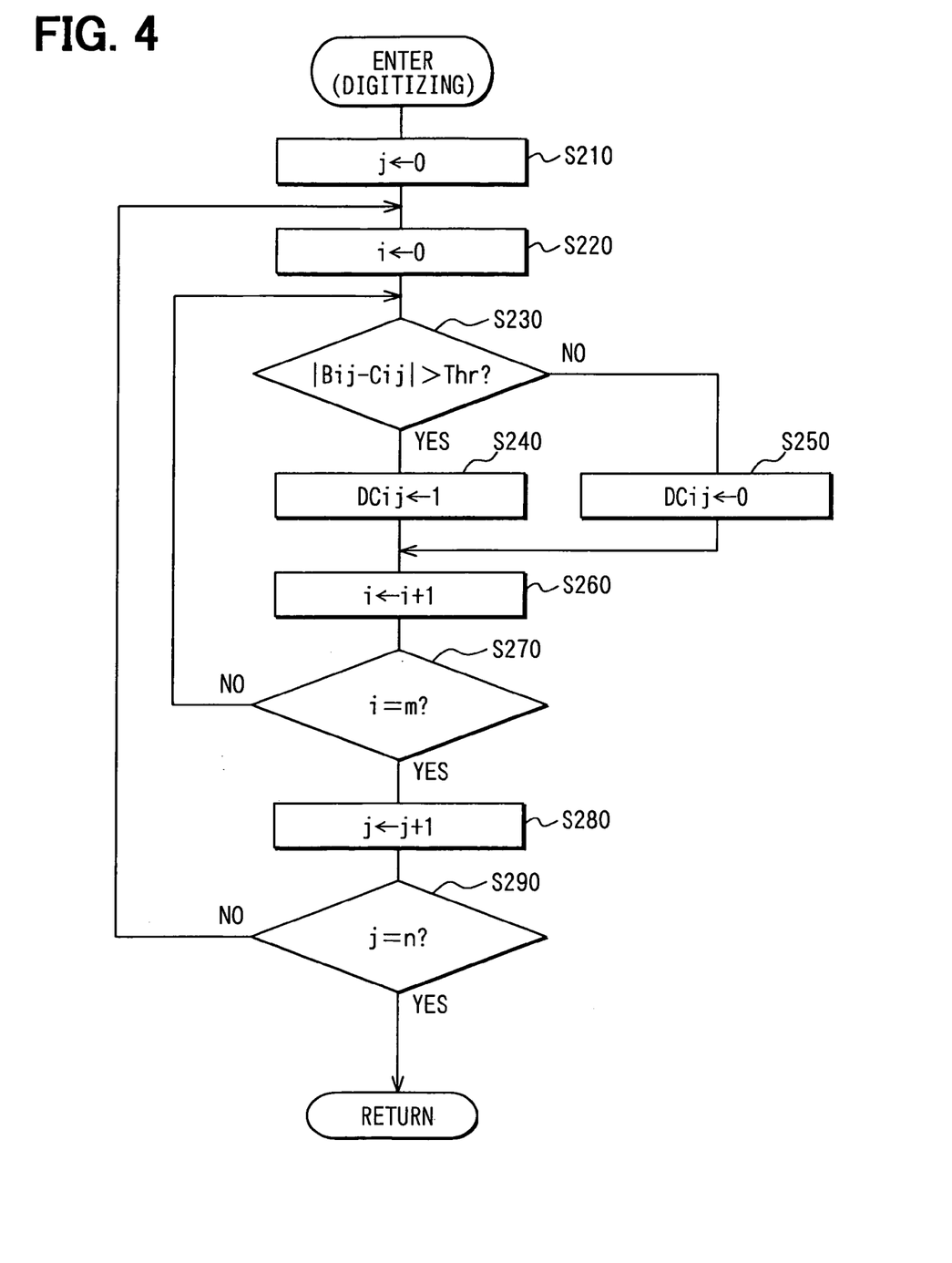
FIG. 4 is a flowchart showing a background difference digitizing process executed in the embodiment.

In the background difference digitizing process, as shown in FIG. 4, a parameter j for specifying a Y-coordinate of each of the pixels forming the image is first initialized to 0 (S210). At the same time, a parameter i for specifying an X-coordinate of each of the pixels forming the image is also initialized to 0 (S220).

Then, it is determined whether an absolute value of a difference between a pixel value $B_{ij}$ of a pixel specified by the parameters i and j in the background image and a pixel value $C_{ij}$ of a pixel specified by the parameters i and j in the input image (i.e., a pixel value of the pixel in the background differential image) is greater than a preset threshold value Thr ($|B_{ij}-C_{ij}|>Thr$) (S230). As the threshold value Thr, a fixed value may be used. Alternatively, an absolute value of a difference between the pixel values (i.e., a pixel value of the background differential image) $|B_{ij}-C_{ij}|$ may be stored as historical data so that the threshold value Thr is set based on an average value of the historical data (for example, a half of the average value or the like).

Then, if it is determined at step S230 that the absolute value ($|Bij-Cij|$) Of the pixel value of the background differential image is greater than the threshold value Thr, a pixel value DCij of the digitized image, which corresponds to a pixel value of a pixel specified by the parameters i and j in the digitized image, is set to 1 (S240). On the other hand, if it is determined that the absolute value ($|Bij-Cij|$) of the pixel value of the background differential image is equal to or smaller than the threshold value Thr, the pixel value DCij of the digitized image is set to 0 (S250).

When the pixel value DCij of the digitized image is set in this manner, the parameter i is incremented (i←i+1) (S260). Then, it is determined whether the parameter i is equal to the number of pixels m in the X-axis direction (S270). At this step, if the parameter i is not equal to the number of pixels m, the process returns to step S230 so as to repeat the process at steps S230 to S260. On the other hand, if the parameter i is equal to the number of pixels m, the parameter j is incremented (j←j+1) (S280). Then, it is determined whether the parameter j is equal to the number of pixels n in the Y-axis direction (S290). At this step, if the parameter j is not equal to the number of pixels n, the process returns to the step S220 so as to repeat the process at steps S220 to S260. On the other hand, if the parameter is equal to the number of pixels n, it is determined that the digitizing process is completed for all the pixels to terminate the process.

Specifically, the input image and the background image are compared with each other by the background difference digitizing process to produce the digitized image. In the digitized image, the pixel value DCij of a region different from the background image (a target region) is represented by 1, whereas the pixel value DCij of a region with no difference (background region) is represented by 0.

Returning to FIG. 3, after the digitized image is generated in this manner, the digitized image of a current frame, which is generated at step S120, and the digitized image of a previous frame, which is stored in the memory unit 17, are compared with each other so as to perform a frame comparing process for generating an inter-frame comparison image (a pixel value Rij) (S130).

Figure 5:
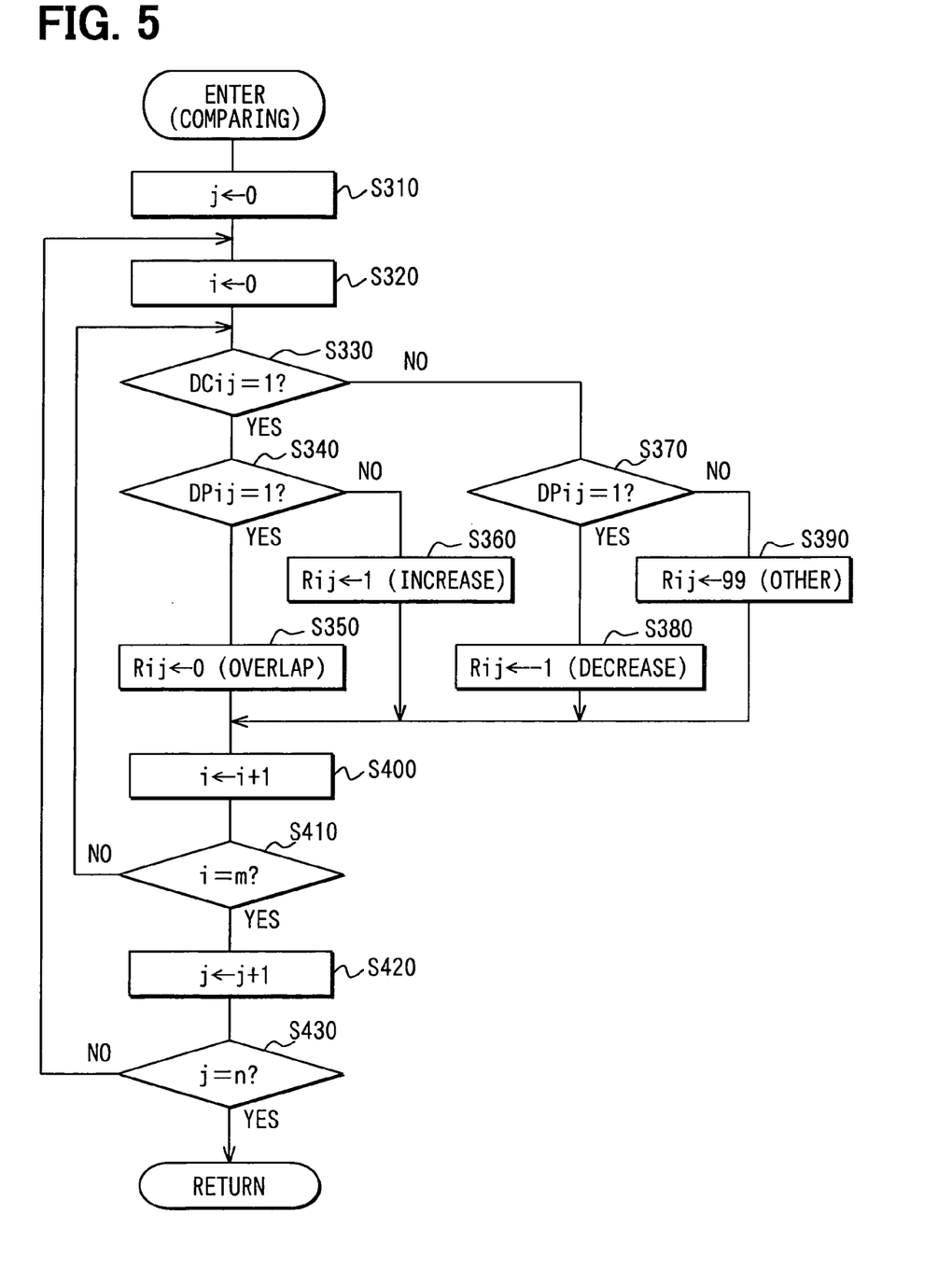
FIG. 5 is a flowchart showing a frame comparing process executed in the embodiment.

In the frame comparing process, as shown in FIG. 5, the parameter j for specifying the Y-coordinate of each of the pixels forming the image is initialized to 0 (S310). At the same time, the parameter i for specifying the X-coordinate of each of the pixels forming the image is initialized to 0 (S320).

Subsequently, assuming that the pixel value of the digitized image of the current frame (current pixel value) is DCij and the pixel value of the digitized image of the previous frame (previous pixel value) is DPij, it is determined whether the current pixel value DCij specified by the parameters i and j is set to 1 (S330) and whether the previous pixel value DPij specified by the parameters i and j is set to 1 (S340 and S370).

Then, if the current pixel value DCij=1 (S330: YES) and the previous pixel value DPij=1 (S340: YES) are both established, that is, the target region remains unchanged, the pixel value Rij of the inter-frame comparison image is set to 0 indicative of an overlap region (S350). If the current pixel value DCij=1 (S330: YES) and the previous pixel value DPij=0 (S340: NO) are both established, that is, the background region is changed to the target region, the pixel value Rij of the inter-frame comparison image is set to 1 indicative of an increased region (S360).

If the current pixel value DCij=0 (S330: NO) and the previous pixel value DPij=1 (S370: YES) are both established, that is, the target region is changed to the background region, the pixel value Rij of the inter-frame comparison image is set to −1 indicative of a decreased region (S380). If the current pixel value DCij=0 (S330: NO) and the previous pixel value DPij=0 (S370: NO) are both established, that is, the background region remains unchanged, the pixel value Rij of the inter-frame comparison image is set to 99 indicative of the other regions (S390).

When the pixel value Rij of the inter-frame comparison image is set in this manner, the parameter i is incremented (i←i+1) (S400). Then, it is determined whether the parameter i is equal to the number of pixels m in the X-axis direction (S410). At this step, if the parameter i is not equal to the number of pixels m, the process returns to the step S330 so as to repeat the process at steps S330 to S400. On the other hand, if the parameter i is equal to the number of pixels m, the parameter j is incremented (j←j+1) (S420). Then, it is determined whether the parameter j is equal to the number of pixels n in the Y-axis direction (S430). At this step, if the parameter j is not equal to the number of pixels n, the process returns to the step S320 so as to repeat the process at steps S320 to S420. On the other hand, if the parameter j is equal to the number of pixels n, it is determined that the comparing process is completed for all the pixels to terminate the process.

Specifically, the inter-frame comparison image divided into regions which can be classified into four types is generated by the frame comparing process. The four types of region are, as shown in [Table 1], in comparison with the previous frame, an increased region (Rij=1) changed from the background region to the target region (DCij=1 and DPij=0), a decreased region (Rij=−1) changed from the target region to the background region (DCij=0 and DPij=1), an overlap region (Rij=0) remaining as the target region (DCij=1 and DPij=1), and the other regions (Rij=99) remaining as the background region (DCij=0 and DPij=0).

TABLE 1

|  | Rij | DCij | DPij |
|---|---|---|---|
| Increased | 1 | 1 | 0 |
| Decreased | −1 | 0 | 1 |
| Overlap | 0 | 1 | 1 |
| The other | 99 | 0 | 0 |

Returning to FIG. 3, if the inter-frame comparison image is generated in this manner, a region dividing (segmentation) process is performed (S140). In the region dividing process, an integrated region obtained by grouping the increased region, the decreased region, and the overlap region based on the same moving object (the same target region) is extracted. At the same time, region parameters composed of the area of the region representing a total number of pixels contained in the region, the sum of X-coordinates obtained by adding up the X-coordinates of all the pixels contained in the region, and the sum of Y-coordinates obtained by adding up the Y-coordinates of all the pixels contained in the region are obtained for each of the integrated region, the increased region, and the decreased region.

Figure 6:
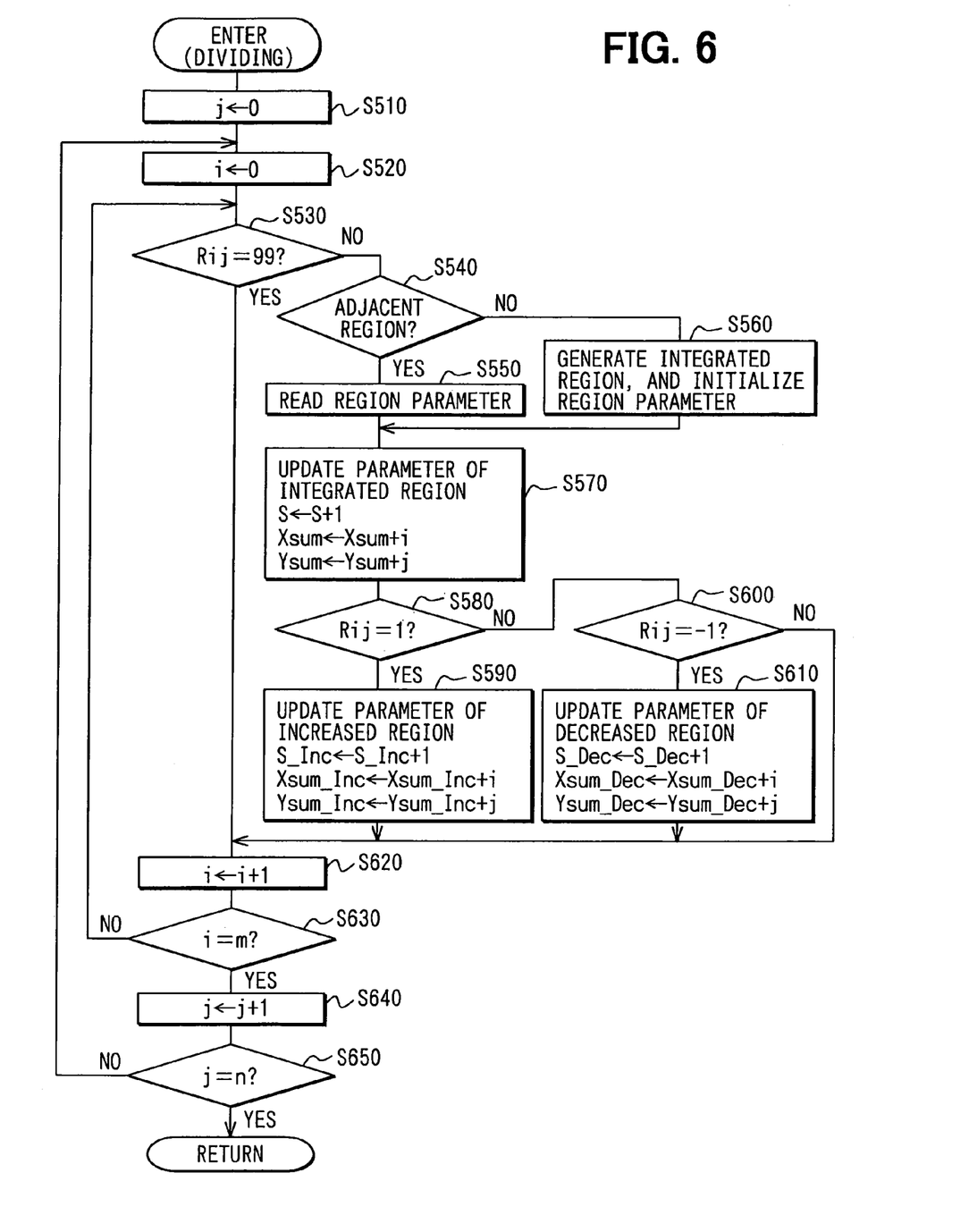
FIG. 6 is a flowchart showing a region dividing process executed in the embodiment.
Figure 7A:
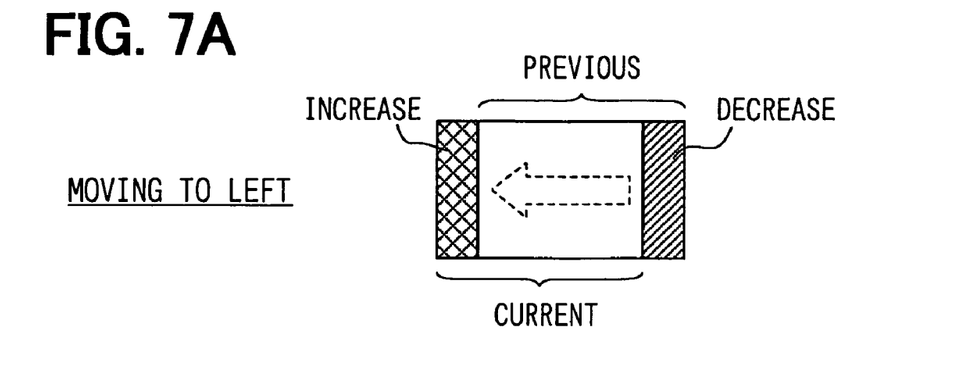
FIGS. 7A to 7D are schematic views conceptually showing that a moving direction and the amount of movement of an object can be obtained in the embodiment from an increased region and a decreased region contained in an integrated area.
Figure 7B:
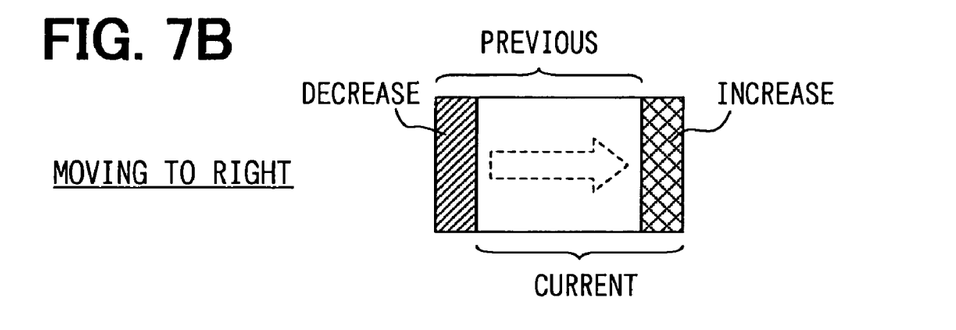
Figure 7C:
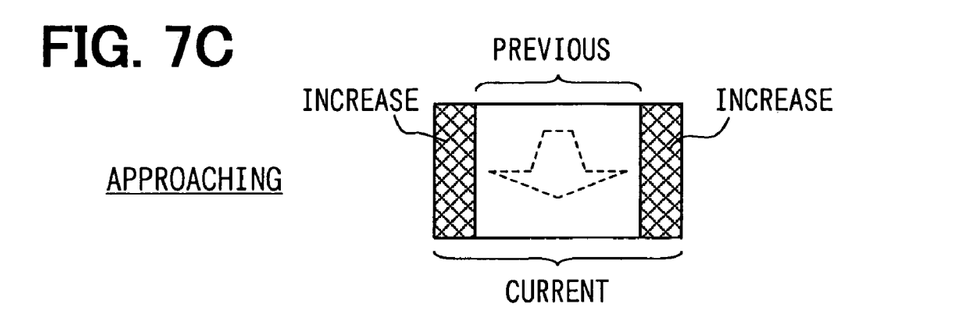
Figure 7D:
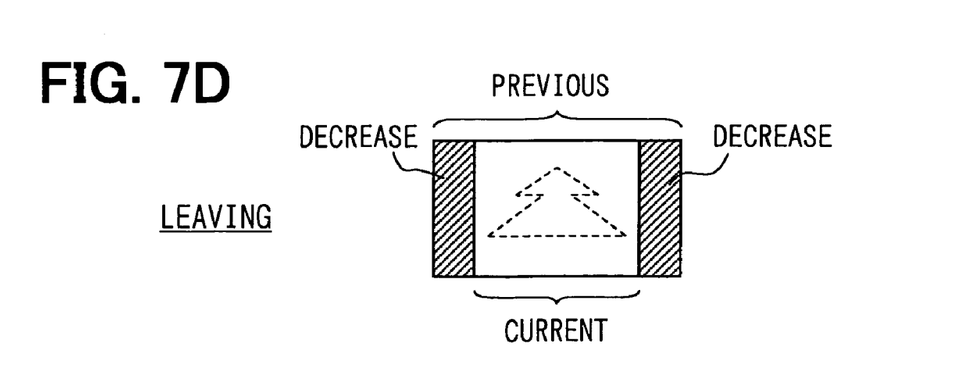

In the region dividing process, as shown in FIG. 6, the parameter j for specifying the Y-coordinate of each of the pixels forming the image is first initialized to 0 (S510). At the same time, the parameter i for specifying the X-coordinate of each of the pixels forming the image is initialized to 0 (S520).

Subsequently, it is determined whether the pixel value Rij of a pixel specified by the parameters i and j in the inter-frame comparison image (specified pixel) is set to 99 indicative of the other regions (S530). If the pixel value Rij of the specified pixel is set to 99, the process proceeds to S620, skipping the process at steps S540 to S610.

On the other hand, if the pixel value Rij of the specified pixel is set to a value other than 99, it is determined whether there is an integrated region adjacent to the specified pixel (S540). If there is an adjacent integrated region, region parameters for the integrated region are read (S550). On the other hand, if there is no adjacent integrated region, it is determined that a region indicated by the pixel value Rij is a new integrated region so as to generate and initialize the region parameters for the integrated region (S560).

Then, among the region parameters prepared at S550 or S560, the region parameters (region area S, sum of X-coordinates Xsum, and sum of Y-coordinates Ysum) for the integrated region are updated (S570). Specifically, the region area S is incremented (S←S+1), the parameter i indicative of the X-coordinate of the specified pixel is added to the sum of X-coordinates Xsum (Xsum←Xsum+i), and the parameter j indicative of the Y-coordinate of the specified pixel is added to the sum of Y-coordinates Ysum (Ysum←Ysum+j).

Subsequently, it is determined whether the pixel value Rij of the specified pixel is set to 1 indicative of the increased region (S580). It is also determined whether the pixel value Rij of the specified pixel is set to −1 indicative of the decreased region (S600).

Then, if the pixel value Rij of the specified pixel is set to 1 (S580: YES), the region parameters for the increased regions (a region area S_Inc, the sum of X-coordinates Xsum_Inc, and the sum of Y-coordinates Ysum_Inc) among the region parameters prepared at S550 or S560 are updated (S590). Then, the process proceeds to S620. Specifically, after the region area S_Inc is incremented (S_Inc←S_Inc+1), the parameter i indicative of the X-coordinate of the specified pixel is added to the sum of X-coordinates Xsum_Inc (Xsum_Inc←Xsum_Inc+i), and the parameter j indicative of the Y-coordinate of the specified pixel is added to the sum of Y-coordinates Ysum_Inc (Ysum_Inc←Ysum_Inc+j).

If the pixel value Rij of the specified pixel is set to −1 (S580: NO and S600: YES), the region parameters for the decreased regions (a region area S_Dec, the sum of X-coordinates Xsum_Dec, and the sum of Y-coordinates Ysum_Dec) among the region parameters prepared at S550 or S560 are updated (S590). Then, the process proceeds to S620. Specifically, after the region area S_Dec is incremented (S_Dec←S_Dec+1), the parameter i indicative of the X-coordinate of the specified pixel is added to the sum of X-coordinates Xsum_Dec (Xsum_Dec←Xsum_Dec+i), and the parameter j indicative of the Y-coordinate of the specified pixel is added to the sum of Y-coordinates Ysumz_Dec (Ysumz_Dec←Ysum_Dec+j).

On the other hand, the pixel value Rij of the specified pixel is set to a value other than 1 and −1 (S580: NO and S600: NO), the process proceeds to S620 without updating the region parameters for the increased region and the decreased region.

After the region parameters are updated in this manner, the parameter i is incremented (i←i+1) (S620). Then, it is determined whether the parameter i is equal to the number of pixels m in the X-axis direction of the image (S630). At this step, if the parameter is not equal to the number of pixels m, the process returns to the step S530 so as to repeat the process at steps S530 to S620. On the other hand, if the parameter i is equal to the number of pixels m, the parameter j is incremented (j←j+1) (S640). Then, it is determined whether the parameter j is equal to the number of pixels n in the Y-axis direction of the image (S650). At this step, if the parameter j is not equal to the number of pixels n, the process returns to the step S520 so as to repeat the process at steps S520 to S640. On the other hand, if the parameter is equal to the number of pixels n, it is determined that the process is completed for all the pixels to terminate the process.

Specifically, in the region dividing process, the increased region, the decrease region, and the overlap region, which are adjacent to each other, is extracted as the integrated region. At the same time, as shown in [Table 2], the region parameters are obtained for each of the extracted integrated region, the increased region, and the decreased region.

TABLE 2

| Region Parameters | Integrated Region | Area | S |
|---|---|---|---|
| | | Sum of X-coordinates | Xsum |
| | | Sum of Y-coordinates | Ysum |
| | Increased Region | Area | S_Inc |
| | | Sum of X-coordinates | Xsum_Inc |
| | | Sum of Y-coordinates | Ysum_Inc |
| | Decreased Region | Area | S_Dec |
| | | Sum of X-coordinates | Xsum_Dec |
| | | Sum of Y-coordinates | Ysum_Dec |

Returning to FIG. 3, after the integrated area is extracted and the region parameters are calculated in the above manner, a motion calculating process for calculating a motion of the object displayed on the integrated area based on the calculated region parameters is performed (S150). Then, the process is terminated.

In the motion calculating process, a motion vector V=(Vx, Vy, Vz) indicative of a moving direction and the amount of movement is calculated for each of the integrated regions extracted at S140, that is, each of the objects displayed on the input image, which are different from the background, by using the following expressions (1) to (3). At the same time, by using expressions (4) and (5), the position of a center of gravity of the integrated region G=(Gx, Gy) is calculated.

[Expression 1]

$$Vx=\{(Xsum-Xsum\_Dec)/(S-S\_Dec)\}-\{(Xsum-Xsum\_Inc)/(S-S\_Inc)\} \quad (1)$$

$$Vy=\{(Ysum-Ysum\_Dec)/(S-S\_Dec)\}-\{(Ysum-Ysum\_Inc)/(S-S\_Inc)\} \quad (1)$$

$$Vz=(S\_Inc-S\_Dec)/S \quad (3)$$

$$Gx=Xsum/S \quad (4)$$

$$Gy=Ysum/S \quad (5)$$

If the integrated region contains a plurality of increased regions and decreased regions (FIGS. 7C and 7D), the region parameters obtained by adding up the region parameters for the same type of region serve as the region parameters of the region (the increased region or the decreased region). FIGS. 7A to 7D show directions of motions determined from changes of images from the previous frame target region to the current frame target region.

Although the position of the center of gravity of the integrated region is obtained in this embodiment, the position of a center of gravity of the target region in the current frame may be obtained instead. In this case, Gx may be obtained by using the first term of the right-hand side of Expression (1), whereas Gy may be obtained by using the first term of the right-hand side of Expression (2).

Next, a motion of the object is tracked for each of the detected objects (integrated regions) by using the motion vector V and the position of the center of gravity G for the object in accordance with the result of detection in the motion detection device 5 in the determination device 7. A suspicious individual or an intruder is determined from the characteristics or the position of the tracked motion.

Specifically, if an object is stationary for a certain period of time in the vicinity of the vehicle or an object moves around the vehicle, the object may be determined as a suspicious individual. If the object is in the vehicle, the object may be determined as an intruder.

Then, when it is determined in the determination device 7 that there is a suspicious individual or an intruder, the communication device 9 informs a pre-registered destination (for example, a user's cell-phone or the like) of the result of determination in the determination device 7.

As described above, in the vehicle surveillance system 1, the digitized image composed of the target region different from the background image and the background region with no difference from the background image is generated for each frame based on the input image from the imaging device 3 and the preset background image (S120). The digitized images are compared between the frames. The overlap region remaining as the object region, the increased region changed from the background region to the target region, and the decreased region changed from the target region to the background region are extracted (S130).

Then, the increased region, the decreased region, and the overlap region, which are adjacent to each other, are extracted as a single integrated region. At the same time, the region parameters (the region area, the sum of X-coordinates, and the sum of Y-coordinates) are obtained for each of the extracted integrated region, the increased region, and the decreased region (S140). The motion of the object (the target region) displayed on the integrated region is obtained for each of the integrated regions based on the region parameters (S150).

Therefore, according to the vehicle surveillance system 1, a motion of the object displayed on the integrated region can be detected for each of the integrated regions. Therefore, even if the input image contains a plurality of object to be detected, a motion of each of the objects to be detected can be individually detected.

Moreover, the generation of the digitized image or the inter-frame comparison image is realized only by the subtraction and the comparison operation for each of the pixels without pattern matching. Furthermore, the integrated area, the increased area, and the decreased area are extracted by determining whether there is an adjacent integrated region for each of the pixels. Moreover, the calculation of the region parameters is realized simply by the increment process without using multiplication and division. Therefore, according to the vehicle surveillance system 1, the amount of operations for motion detection can be remarkably reduced as compared with a conventional device. Consequently, since the motion detection can be implemented and the presence of a suspicious individual or an intruder can be determined with a reduced amount of operations, the vehicle surveillance system 1 can be configured by using an inexpensive arithmetic processing unit.

Furthermore, in the vehicle surveillance system 1 in this embodiment, a fisheye camera is used as the imaging device 3. Moreover, the imaging device 3 is provided in the middle of the interior roof of the vehicle so that a single camera can take images of the vehicle interior and all around the vehicle through a window. Specifically, since the structure for obtaining an input image is simple, the vehicle surveillance system 1 can be suitably used as vehicle-mounted equipment provided in the vehicle having a limited space.

The present invention is not limited to the above embodiment, but may be implemented in various modes without departing from the scope of the invention.

For example, although the fisheye camera is used as the imaging device 3, an omnidirectional camera may be used instead. Moreover, an infrared camera or a camera for supplying a distance image having a pixel value in accordance with a distance to an imaged object to be measured as an input image may also be used as the imaging device 3. In these cases, even an object having a low luminance can be surely captured as an image.

What is claimed is:

1. A motion detection method comprising the steps of:
    digitizing a background differential image corresponding to a differential image between an input image sequentially input for each frame and a preset background image so as to generate a digitized image composed of a target region different from the background image and a background region with no difference from the background image for each frame;
    determining an overlap region when a value of a common pixel in a current frame is equal to the value of the same pixel in a frame directly preceding the current frame;
    determining an increased region when the value of a common pixel in the current frame is greater than the value of the same pixel in the frame directly preceding the current framed;
    determining a decreased region when the value of a common pixel in the current frame is less than the value of the same pixel in the frame directly preceding the current frame;
    comparing digitized images between frames to extract the overlap region remaining as the target region, the increased region changed from the background region to the target region, and the decreased region changed from the target region to the background region;
    when the increased region and the decreased region are adjacent to the overlap region, obtaining an integrated region by grounding the increased region, the decreased region, and the overlap region;
    for each of the integrated region, the increased region, and the decreased region, obtaining region parameters composed of the number of pixels contained in the region, a sum of X-coordinates obtained by adding X-coordinate values in two-dimensional coordinates indicating a position of a pixel for all the pixels contained in the region, and a sum of Y-coordinates obtained by adding Y-coordinate values for all the pixels contained in the region; and
    detecting a motion of a moving object displayed on the integrated region for each of the integrated regions based on the region parameters.

2. A motion detection device comprising:
    digitized image generating means for digitizing a background differential image corresponding to a differential image between an input image sequentially input for each frame and a preset background image so as to generate a digitized image composed of a target region different from the background image and a background region with no difference from the background image for each frame;

frame comparison means for determining an overlap region when a value of a common pixel in a current frame is equal to the value of the same pixel in a frame directly preceding the current frame, for determining an increased region when the value of a common pixel in the current frame is greater than the value of the same pixel in the frame directly preceding the current frame, and for determining a decreased region when the value of a common pixel in the current frame is less than the value of the same pixel in the frame directly preceding the current frame;

region extracting means for comparing digitized images generated in the digital image generating means between frames to extract the overlap region remaining as the target region, the increased region changed from the background region to the target region, and the decreased region changed from the target region to the background region and, when the increased region and the decreased region are adjacent to the overlap region, for obtaining an integrated region by grouping the increased region, the decreased region, and the overlap region;

region parameter calculating means for, for each of the integrated region, the increased region, and the decreased region, obtaining region parameters composed of the number of pixels contained in the region, a sum of X-coordinates obtained by adding X-coordinate values in two-dimensional coordinates indicating a position of a pixel for all the pixels contained in the region, and a sum of Y-coordinates obtained by adding Y-coordinate values for all the pixels contained in the region; and motion detecting means for detecting a motion of a moving object displayed on the integrated region for each of the integrated regions based on the region parameters.

3. The motion detection device according to claim 2, wherein the motion detection means obtains a position of a center of gravity of the moving object before and after movement based on the region parameters so as to detect a motion of the moving object.

4. A vehicle surveillance system comprising:

digitized image generating means for digitizing a background differential image corresponding to a differential image between an input image sequentially input for each frame and a preset background image so as to generate a digitized image composed of a target region different from the background image and a background region with no difference from the background image for each frame;

frame comparison means for determining an overlap region when a value of a common pixel in a current frame is equal to the value of the same pixel in a frame directly preceding the current frame, for determining an increased region when the value of a common pixel in the current frame is greater than the value of the same pixel in the frame directly preceding the current frame, and for determining a decreased region when the value of a common pixel in the current frame is less than the value of the same pixel in the frame directly preceding the current frame;

region extracting means for comparing digitized images generated in the digital image generating means between frames to extract the overlap region remaining as the target region, the increased region changed from the background region to the target region, and the decreased region changed from the target region to the background region and, when the increased region and the decreased region are adjacent to the overlap region, for obtaining an integrated region by grouping the increased region, the decreased region, and the overlap region;

region parameter calculating means for, for each of the integrated region, the increased region, and the decreased region, obtaining region parameters composed of the number of pixels contained in the region, a sum of X-coordinates obtained by adding X-coordinate values in two-dimensional coordinates indicating a position of a pixel for all the pixels contained in the region, and a sum of Y-coordinates obtained by adding Y-coordinate values for all the pixels contained in the region;

motion detecting means for detecting a motion of a moving object displayed on the integrated region for each of the integrated regions based on the region parameters; imaging means provided in a vehicle compartment so as to supply an image captured by taking the vehicle compartment or the vicinity of the vehicle through a window to the motion detection device as the input image;

determination means for determining a presence of any of an intruder and a suspicious individual based on a result of detection in the motion detection device; and notification means for notifying a result of determination in the determination means.

5. The vehicle surveillance system according to claim 4, wherein the imaging means is provided on an interior roof of the vehicle.

6. The vehicle surveillance system according to claim 4, wherein the imaging means includes any one of a fisheye camera and an omnidirectional camera.

7. The vehicle surveillance system according to claim 4, wherein the imaging means includes an infrared camera.

8. The vehicle surveillance system according to claim 4, wherein the imaging means supplies a distance image having a pixel value in accordance with a distance to an imaged object to be measured as the input image.

9. A computer-readable medium comprising instructions being executed by a computer, the instructions including a computer-implemented method for detecting motion, the instructions for:

digitizing a background differential image corresponding to a differential image between an input image sequentially input for each frame and a preset background image so as to generate a digitized image composed of a target region different from the background image and a background region with no difference from the background image for each frame;

determining an overlap region when a value of a common pixel in a current frame is equal to the value of the same pixel in the frame directly preceding the current frame;

determining an increased region when the value of a common pixel in the current frame is greater than the value of the same pixel in the frame directly preceding the current frame;

determining a decreased region when the value of a common pixel in the current frame is less than the value of the same pixel in the frame directly preceding the current frame;

comparing digitized images between frames to extract the overlap region remaining as the target region, the increased region changed from the background region to the target region, and the decreased region changed from the target region to the background region;

when the increased region and decreased region are adjacent to the overlap region, obtaining an integrated region by grouping the increased region, the decreased region, and the overlap region;

for each of the integrated region, the increased region, and the decreased region, obtaining region parameters composed of the number of pixels contained in the region, a sum of X-coordinates obtained by adding X-coordinate values in two-dimensional coordinates indicating a position of a pixel for all the pixels contained in the region, and a sum of Y-coordinates obtained by adding Y-coordinate values for all the pixels contained in the region; and detecting a motion of a moving object displayed on the integrated region for each of the integrated regions based on the region parameters.

* * * * *